United States Patent
Tao et al.

(10) Patent No.: US 12,083,948 B2
(45) Date of Patent: Sep. 10, 2024

(54) VEHICLE LAMP ASSEMBLY, VEHICLE LAMP AND CORRESPONDING MOTOR VEHICLE

(71) Applicant: VALEO VISION, Bobigny (FR)

(72) Inventors: Qiuyang Tao, Bobigny (FR); Wenling Zhang, Bobigny (FR); Dong Yang, Bobigny (FR)

(73) Assignee: Valeo Vision, Bobigny (FR)

( * ) Notice: Subject to any disclaimer, the term of this patent is extended or adjusted under 35 U.S.C. 154(b) by 213 days.

(21) Appl. No.: 17/626,917

(22) PCT Filed: Jul. 22, 2020

(86) PCT No.: PCT/CN2020/103476
§ 371 (c)(1),
(2) Date: Jul. 7, 2022

(87) PCT Pub. No.: WO2021/013171
PCT Pub. Date: Jan. 28, 2021

(65) Prior Publication Data
US 2023/0051211 A1    Feb. 16, 2023

(30) Foreign Application Priority Data

Jul. 23, 2019   (CN) .......................... 201921169018.9

(51) Int. Cl.
*F21S 41/24*    (2018.01)
*B60Q 1/04*    (2006.01)
(Continued)

(52) U.S. Cl.
CPC ......... *B60Q 1/0483* (2013.01); *B60Q 1/2623* (2013.01); *F21S 41/24* (2018.01);
(Continued)

(58) Field of Classification Search
CPC .......... F21S 41/24; F21S 41/55; F21S 43/247; F21S 43/275; F21S 43/51; B60Q 1/0483
See application file for complete search history.

(56) References Cited

U.S. PATENT DOCUMENTS

| 4,530,041 A | 7/1985 | Yamai et al. | |
| 6,921,184 B2* | 7/2005 | Tufte | B60Q 1/32 362/217.08 |

(Continued)

FOREIGN PATENT DOCUMENTS

| CN | 1904468 A | 1/2007 |
| CN | 205118883 U | 3/2016 |

(Continued)

OTHER PUBLICATIONS

China National Intellectual Property Administration (ISA/CN), International Search Report (with English translation) and Written Opinion of corresponding International Application No. PCT/CN2020/103476, dated Sep. 29, 2020.

*Primary Examiner* — Julie A Bannan
(74) *Attorney, Agent, or Firm* — Valeo Vision

(57) ABSTRACT

A vehicle lamp assembly, a vehicle lamp and a corresponding motor vehicle. The vehicle lamp assembly including a support, for supporting a light emitting body. The vehicle lamp assembly further includes a housing provided to overlap with at least a part of the support and a first gap formed between the overlapping portions of the housing and the support. The vehicle lamp assembly additionally includes a first light blocking layer, with the first light blocking layer being provided between the overlapping portions of the housing and the support, and at least partially filling the first gap, so as to prevent light from the light emitting body from emitting outwards through the first gap.

15 Claims, 5 Drawing Sheets

(51) Int. Cl.
  *B60Q 1/26* (2006.01)
  *F21S 41/275* (2018.01)
  *F21S 41/55* (2018.01)
  *F21S 43/247* (2018.01)
  *F21S 43/50* (2018.01)

(52) U.S. Cl.
  CPC ............ *F21S 41/275* (2018.01); *F21S 41/55* (2018.01); *F21S 43/247* (2018.01); *F21S 43/51* (2018.01)

(56) References Cited

U.S. PATENT DOCUMENTS

| | | | |
|---|---|---|---|
| 7,559,679 B2 | 7/2009 | Isayama et al. | |
| 9,033,565 B2 * | 5/2015 | Pfeil | G02B 6/001 362/555 |
| 2006/0133065 A1 * | 6/2006 | Douglass | F21V 33/004 362/101 |

FOREIGN PATENT DOCUMENTS

| | | |
|---|---|---|
| CN | 205669746 U | 11/2016 |
| CN | 206496295 U | 9/2017 |
| CN | 207555481 U | 6/2018 |
| CN | 207555512 U | 6/2018 |
| CN | 210771928 U | 6/2020 |

\* cited by examiner

VEHICLE LAMP ASSEMBLY, VEHICLE LAMP AND CORRESPONDING MOTOR VEHICLE

CROSS-REFERENCE TO RELATED APPLICATIONS

This application is filed under 35 U.S.C. § 371 U.S. National Phase of International Application No. PCT/CN2020/103476 filed Jul. 22, 2020 (published as WO2021013171), which claims priority benefit to Chinese application No. 201921169018.9 filed on Jun. 16, 2020, the disclosures of which are herein incorporated by reference in their entirety.

TECHNICAL FIELD

The embodiments of the present invention generally relate to the field of lighting and/or signaling, and in particular to a vehicle lamp assembly and a vehicle lamp that can at least partially prevent light leakage, and a motor vehicle equipped with the vehicle lamp.

BACKGROUND OF THE INVENTION

A variety of lighting and/or signaling devices are used to provide light for lighting and/or optical indications, and are widely used in various fields. For example, lighting devices or signaling devices such as vehicle lights are used in motor vehicles to ensure safety. In motor vehicles, various types of vehicle lamp assemblies are often required to implement different functions, such as high beams, low beams, fog lights, turn signals, daytime running light assemblies, tail lights, stop light assemblies, etc. Some vehicle lamp assemblies combine or integrate two or more of these functions.

After the assembly or in actual use of a conventional lighting or signaling device as a vehicle lamp, due to structural/space constraints, design defects, assembly inaccuracy or errors, displacement of components in the vehicle lamp assembly after vibration, and other factors, the lights emitted from adjacent light sources with different functions may pass through the gaps between the components, thus causing light leakage or even mixing of lights with different functions. This will change or even reduce or weaken the intended lighting or signaling function, light intensity and/or lighting effect, which is disadvantageous for the safe travelling of motor vehicles, cannot meet relevant requirements in laws and regulations, and will adversely affect the overall aesthetics of the vehicle lamp assembly.

BRIEF SUMMARY OF THE INVENTION

One purpose of the present invention is to overcome at least one of the above and other problems and shortcomings in the prior art.

According to one aspect of the present invention, one embodiment provides a vehicle lamp assembly, comprising: a bracket, used to support a light emitting body; a shell, configured to overlap with at least a part of the bracket, wherein a first gap exists between the overlapping parts of the shell and the bracket; and a first light blocking layer, provided between the overlapping parts of the shell and the bracket, and at least partially filling the first gap, to prevent light from the light emitting body from emitting outward through the first gap.

In some embodiments, the first light blocking layer comprises an elastic layer.

In some embodiments, the first light blocking layer is integrally formed on one of the surfaces of the shell and the bracket facing each other by means of a two-shot injection molding process or a co-extrusion process.

In some embodiments, the first light blocking layer is disposed in a compressed state between the overlapping parts of the shell and the bracket, so that the first light blocking layer abuts on the surfaces of the shell and the bracket facing each other.

In some embodiments, the first light blocking layer adheres to one of the surfaces of the shell and the bracket facing each other by means of an adhesive.

In some embodiments, the vehicle lamp assembly further comprises: a light transmissive cover, which has a supporting part mounted on the shell, wherein a second gap exists between the supporting part and the shell; and a second light blocking layer, filling the second gap at least partially, to prevent light from the light emitting body from emitting ourtwardthrough the second gap.

In some embodiments, a third gap exists between the supporting part of the light transmissive cover and the bracket, and the vehicle lamp assembly further comprises a third light blocking layer, wherein the third light blocking layer fills the third gap at least partially, to prevent light from the light emitting body from going out through the third gap.

In some embodiments, the shell comprises a decorative frame, wherein the decorative frame is arranged to overlap with at least a part of the bracket, and the first gap is located between the overlapping parts of the decorative frame and the bracket.

In some embodiments, the shell further comprises a housing, wherein the housing at least partially defines the outer contour of the vehicle lamp assembly, the housing is provided on the outside of the decorative frame and at least partially overlaps with the decorative frame, and a fourth gap exists between the overlapping parts of the housing and the decorative frame; the vehicle lamp assembly further comprises a fourth light blocking layer, filling the fourth gap at least partially, to prevent light from the light emitting body from emitting outward through the fourth gap.

In some embodiments, the vehicle lamp assembly further comprises a spacer layer, provided between the light emitting body and the bracket, wherein the spacer layer is at least in contact with the parts of the light emitting body and the bracket facing each other.

In some embodiments, the first light blocking layer and the spacer layer may be one piece.

In some embodiments, the vehicle lamp assembly further comprises the light emitting body, which comprises a light source and/or a light guide.

In some embodiments, the vehicle lamp assembly comprises at least one of low beam lights, high beam lights, turn signals, position lights, reversing lights, fog lights, daytime running lights, and stop lights.

According to another aspect of the present invention, one embodiment also provides a motor vehicle, comprising the vehicle lamp assembly described in any of the embodiments of the present invention.

Other purposes and advantages of the present invention will become obvious through the detailed description of the present invention with reference to the drawings, which also helps to obtain a comprehensive understanding of the present invention.

BRIEF DESCRIPTION OF THE DRAWINGS

These and/or other aspects, features and advantages of the present invention will become obvious and easy to understand through the following description of illustrative embodiments in conjunction with the drawings, wherein.

LIST OF REFERENCE NUMERALS

Figure 1:
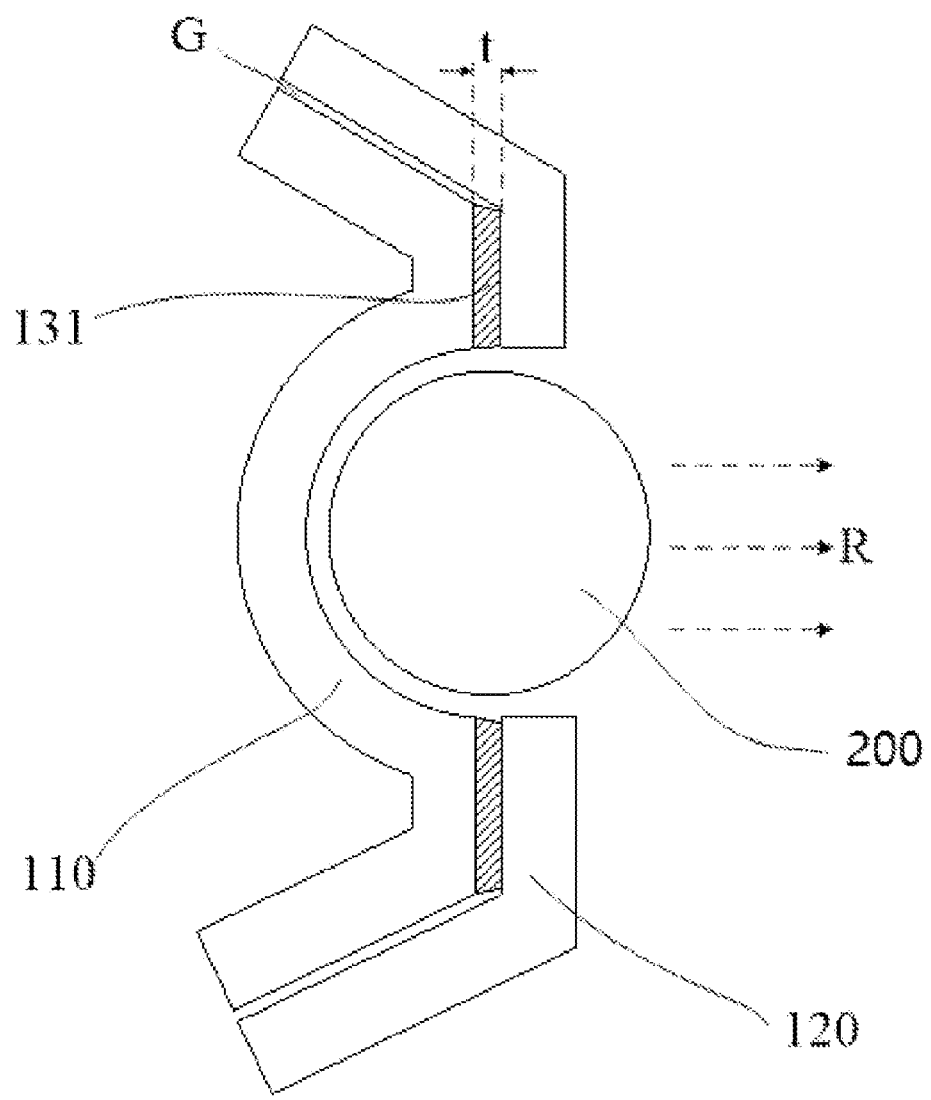
FIG. 1 is a schematic structural diagram of the vehicle lamp assembly according to one exemplary embodiment of the present invention.

| 100 | Shell | 200 | Light emitting body |
|---|---|---|---|
| 110 | Bracket | 120 | Decorative frame |
| 131 | First light blocking layer | 132 | Second light blocking layer |
| 133 | Third light blocking layer | 134 | Fourth light blocking layer |
| 140 | Light transmissive cover | 141 | Supporting part |
| 150 | Housing | 160 | Space layer |

DETAILED DESCRIPTION OF THE INVENTION

Embodiments of the present invention are described in detail below in conjunction with the drawings. In this description, the same or similar components are indicated by the same or similar reference numerals. The following description of the embodiments of the present invention with reference to the drawings is intended to explain the general concept disclosed for the present invention, and should not be understood as a limitation on the present invention.

Furthermore, in the detailed description below, to facilitate explanation, many specific details are expounded in order to provide a comprehensive understanding of embodiments of the present invention. However, it is obvious that one or more embodiments could also be implemented without these specific details. In other cases, well-known structures and devices are shown in the form of illustrations to simplify the drawings.

According to one general concept of the present invention, the vehicle lamp assembly has a plurality of components surrounding a light emitting body, such as a light source or a light guide, these components may have overlapping parts, and light blocking layers are used to fill the gaps between the components at the overlapping parts, to prevent light from the light emitting body from going out through these gaps, thereby effectively preventing light leakage and improving the lighting effect of the vehicle lamp.

Figure 2:
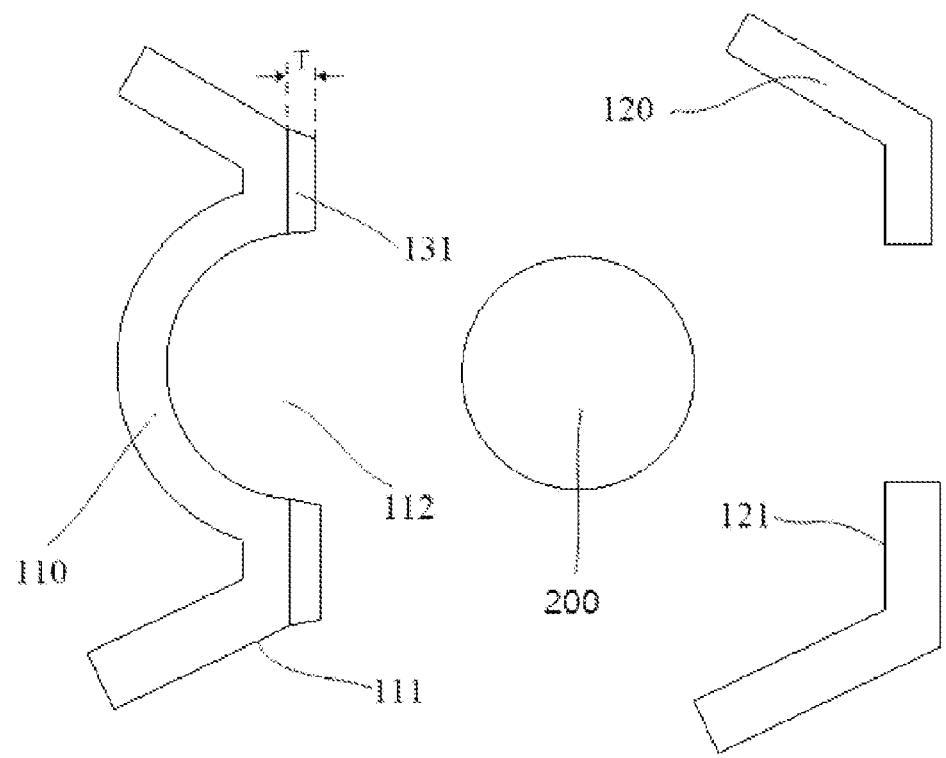
FIG. 2 is a schematic exploded view of the structure of the vehicle lamp assembly according to the exemplary embodiment of the present invention.

FIGS. 1 and 2 schematically show the structure of the vehicle lamp assembly according to an exemplary embodiment of the present invention. As shown in the figures, the vehicle lamp assembly comprises a bracket 110 used for or accommodating and supporting a light emitting body 200. For example, the bracket 110 has a groove 112, the groove 112 can match at least part of the outer contour of the light emitting body 200, and the light emitting body 200 is at least partially positioned in the groove 112 and gives out light in the target direction R. Exemplarily, the light emitting body described herein may be a light source, for example, an incandescent lamp, a halogen lamp, an LED lamp, a xenon lamp, a laser source, etc., or may be a component that receives light from a light source and guides and emits light, for example, a light guide, a light pipe, etc., or a combination of a light source and a light guiding component.

The vehicle lamp assembly further comprises a shell 100, which is arranged or mounted to overlap at least part of the bracket 110. Ideally, the overlapping parts of the shell 100 and the bracket 110 are in close contact. However, in practice, due to design defects, manufacturing errors, fitting or assembly inaccuracy or errors, installation structure/space limitations, displacement of internal components of the vehicle lamp assembly after vibration, and other factors, there is a gap between the overlapping parts of the shell 100 and the bracket 110, as shown by the first gap G in the figures, and light from the light emitting body 200 may exit or leak through the gap. Due to the existence of this gap, lights from adjacent light sources with different lighting or signaling functions may pass through the gap, causing light leakage or even mixing of lights with different functions. This will change or even reduce or weaken the intended lighting or signaling function, light intensity and/or lighting effect, which is disadvantageous for the safe travelling of motor vehicles, cannot meet relevant requirements in laws and regulations, and will adversely affect the overall aesthetics of the vehicle lamp assembly.

In the embodiment shown in the figures, the vehicle lamp assembly further comprises a first light blocking layer 131 provided between the shell 100 and the bracket 110 at the overlapping part, which fills the first gap G at least partially, to prevent light from the light emitting body 200 from going out or leaking through the first gap G, so that light from the light emitting body 200 can be sent out in the target direction R in a way that meets the requirements for the lighting or signaling function, light intensity and/or lighting effect.

In some embodiments, the shell 100 may comprise a decorative frame 120. The decorative frame 120 is also referred to as the decor frame or the transition plate of the vehicle lamp, which is used to shield the electronic/optical components in the vehicle lamp and plays a decorative role. As shown in the Figures, the decorative frame 120 is arranged or mounted to overlap at least part of the bracket 110. The first gap G is located between the decorative frame 120 and the bracket 110 at the overlapping part. Exemplarily, at the overlapping part, the bracket 110 has a surface 111 facing the decorative frame 120, and the decorative frame 120 has a surface 121 facing the bracket 110. The material, thickness, etc. of the first light blocking layer 131 are selected so that it is configured to abut on or closely contact the surfaces 111 and 121 of the decorative frame 120 and the bracket 110 facing each other, and at least provides optical sealing between the decorative frame 120 and the bracket 110. It can be understood that the first light blocking layer 131 may surround the light emitting body in a continuous or discontinuous manner to optically seal the gap between the decorative frame 120 and the bracket 110 at different positions. In addition, depending on factors such as the light blocking requirements, process conditions, ease of assembly, installation robustness, etc., the first light blocking layer 131 may fill all or part of the first gap G.

According to an exemplary embodiment of the present invention, the first light blocking layer 131 may comprise an elastic layer or an elastic member, which can be elastically deformed, and can be squeezed or compressed between the shell 100 (for example, the decorative frame 120) and the bracket 110 at the overlapping part after assembly, so as to about on or closely contact the surfaces of the shell 100 (for example, the decorative frame 120) and the bracket 110 facing each other.

Preferably, the first light blocking layer 131 comprises a layer made of an elastically deformable material. More preferably, the first light blocking layer 131 comprises a thermoplastic elastic layer.

Exemplarily, as shown in FIGS. 1 and 2, the first light blocking layer 131 has a thickness T before being squeezed or compressed, and has a thickness t after being squeezed or compressed between the shell 100 (for example, the decorative frame 120) and the bracket 110, wherein the thickness t is smaller than the thickness T. Therefore, even if there are design defects, manufacturing errors, inaccuracy or errors in fitting or assembly, installation structure/space limitations, displacement of components in the vehicle lamp assembly after vibration, and other unfavorable factors in actual use, this elastic member or elastic layer deformed under compression can overcome or eliminate these unfavorable factors, and well match or adapt to the gaps of various sizes between the various components of the vehicle lamp, thereby achieving a better light blocking effect without the need to design complex overlaps or light-shielding structures, making manufacturing and assembly easy, and reducing the cost of manufacturing and assembly. In addition, this elastic member or elastic layer can also adapt to the structures or shapes of different components of the vehicle lamp (including the abovementioned bracket 110, decorative frame 120, shell 100, etc.), or the arrangement of components thereon, to provide good optical sealing.

Exemplarily, the first light blocking layer 131 may be made of an elastically deformable material or a flexible material with elasticity or compressibility, for example, a variety of suitable sealing materials, including but not limited to thermoplastic elastomers (TPEs), thermoplastic polyester elastomers (TPEEs), ethylene-propylene-diene monomers (EPDMs), nitrile rubber, silica gel, chloroprene rubber, polyurethane rubber, resins, foams, etc. In the embodiments of the present invention, TPEs are preferably used to make the light blocking layer. TPEs have the characteristics of high elasticity, high strength and high resilience of rubber, and can be used in the injection molding process. They are environmentally friendly, non-toxic and safe, have a wide range of hardness, excellent colorability, soft touch, weather resistance, fatigue resistance and temperature resistance, and excellent processing performance. They can be recycled without the need of vulcanization to reduce costs. They may be formed by two-shot injection molding to be coated and bonded with the material (for example, PP, PE, PC, PS, ABS and other matrix materials) of the structural parts of the vehicle lamp, and may also be formed separately. Exemplarily, the abovementioned elastic layer or elastic member, elastically deformable material, elastic or compressible flexible material, or a layer made thereof is opaque or light-shielding, so as to provide a light blocking function.

In some examples, the first light blocking layer 131 may adhere to one of the surfaces of the shell 100 (for example, the decorative frame 120) and the bracket 110 facing each other by means of an adhesive. In some other examples, the first light blocking layer 131 may be formed on one of the surfaces of the shell 100 (for example, the decorative frame 120) and the bracket 110 facing each other through a two-shot injection molding process or a co-extrusion process, to form an integral structure with the shell 100 (for example, the decorative frame 120) or the bracket 110. In some other examples, there is no connector between the first light blocking layer 131 and the shell 100 or the bracket 110, but the first light blocking layer 131 is pressed on the bracket 110 by the shell 100, or the first light blocking layer 131 and the shell 100 or the bracket 110 are connected to each other by form fitting or press fitting.

Figure 3:
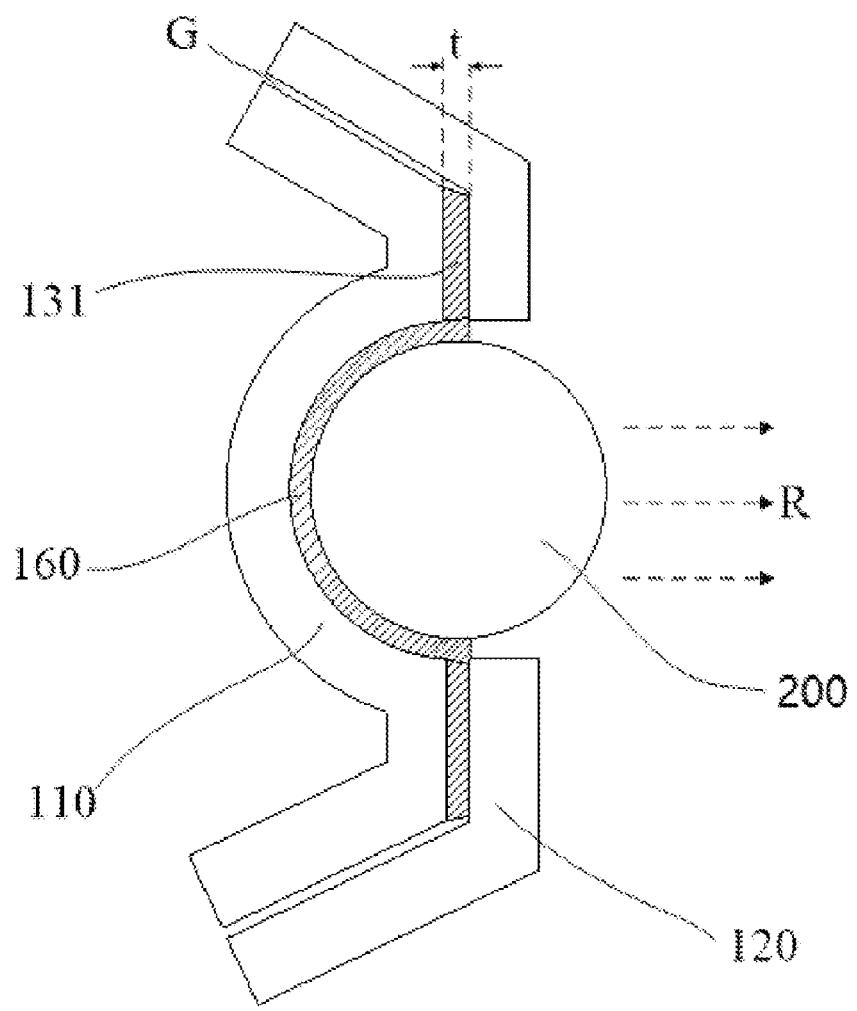
FIG. 3 is a schematic structural diagram of the vehicle lamp assembly according to another exemplary embodiment of the present invention.
Figure 5:
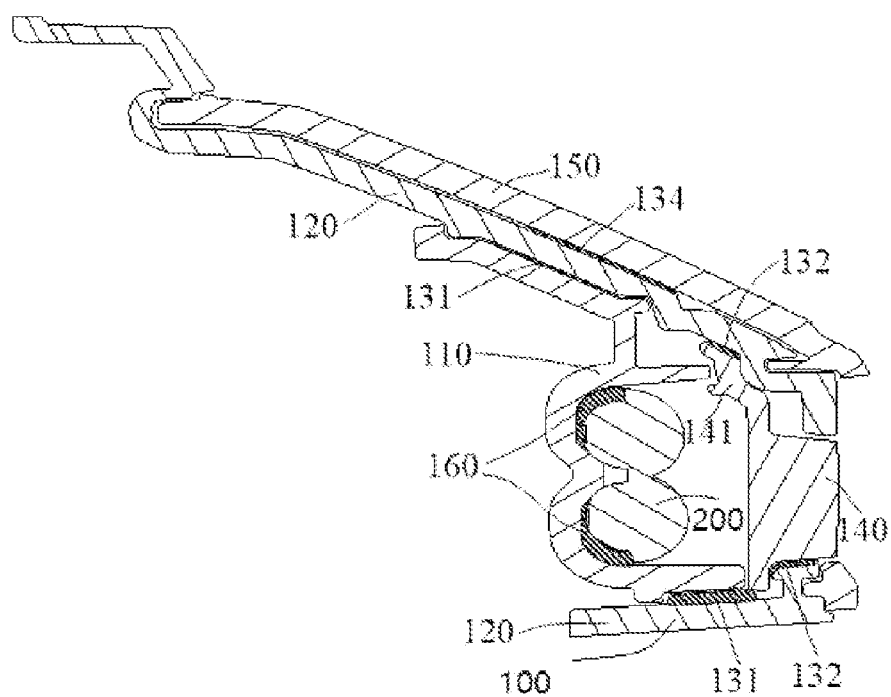
FIG. 5 is a schematic profile view of an exemplary structure of the vehicle lamp assembly according to another exemplary embodiment of the present invention.

In some exemplary embodiments of the present invention, as shown in FIGS. 3 and 5, the vehicle lamp assembly may further comprise a spacer layer 160 provided between the light emitting body 200 and the bracket 110, which, for example, is in contact with the light emitting body 200 and the bracket 110 at least at the parts facing each other, and can well match or adapt to the contour or shape of the parts of the light emitting body 200 and the bracket 110 facing each other, so that the light emitting body 200 can be more stably supported on the bracket 110. In addition, the spacer layer 160 can provide a smooth supporting surface to support and contact the light emitting body 200, thereby ensuring uniformity of the light from the light emitting body 200. In some embodiments, the spacer layer 160 may comprise an elastic material layer or an elastic member. For example, it may be made of an elastically deformable material, a flexible material with elasticity or compressibility, etc., to provide better contour or shape matching between the light emitting body 200 and the bracket 110.

Preferably, the first light blocking layer 131 and the spacer layer 160 may be one piece.

More preferably, the first light blocking layer 131 and the spacer layer 160 may be made of the same material.

Those skilled in the art should understand that, when the first light blocking layer 131 and the spacer layer 160 form one piece made of the same material, only one injection port is needed to complete the injection of the entire piece, and the manufacturing process is simpler.

Figure 4:
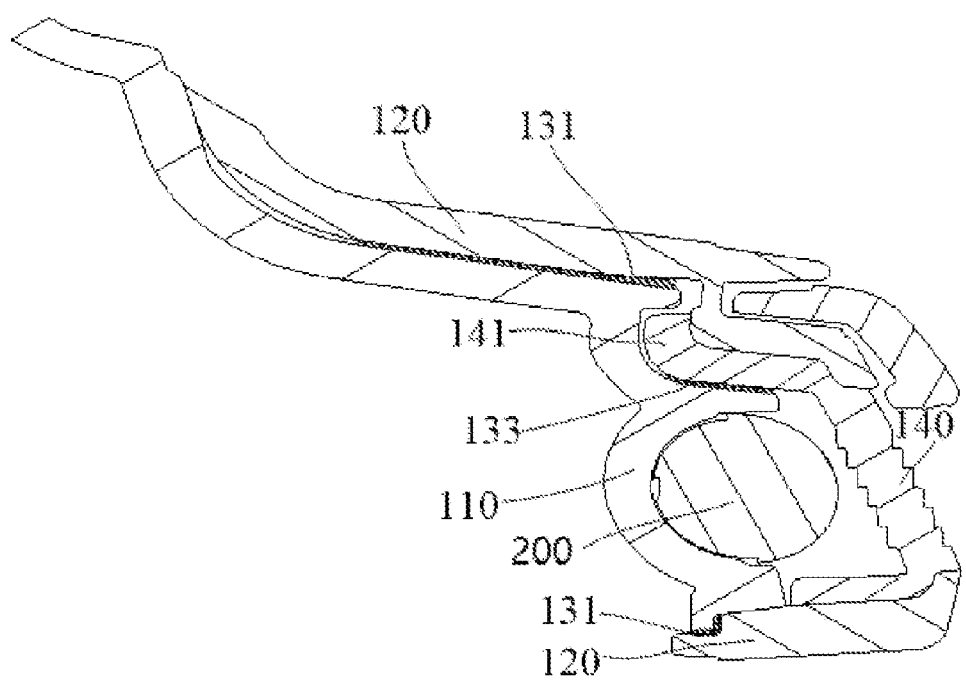
FIG. 4 is a schematic profile view of an exemplary structure of the vehicle lamp assembly according to one exemplary embodiment of the present invention.

In the illustrated embodiment, as shown in FIGS. 4 and 5, the vehicle lamp assembly further comprises a light transmissive cover 140. In some examples, the light transmissive cover 140 may be integrated with the decorative frame 120, for example, formed by a two-color injection molding process or a two-shot molding process, and there is no gap between the two, as shown in FIG. 4. The light transmissive cover 140 is also referred to as the lens or the outer lens of the vehicle lamp. It at least provides the function of uniformly emitting the light of the vehicle lamp. It is usually made of a light-transmitting material, for example, a transparent resin, and has a streamlined shape matching that of the vehicle body. Of course, from an aesthetic point of view, the light transmissive cover 140 may also take any other shapes. In other examples, the light transmissive cover 140 may be mounted or assembled to the decorative frame 120, as shown in FIG. 5. Similarly, due to design, installation structure, or aesthetic requirements, there may be a second gap between the light transmissive cover and the decorative frame, and it is also undesirable that light of the vehicle lamp assembly exits through this gap. Therefore, in one embodiment of the present invention, as shown in FIG. 5, the vehicle lamp assembly is further provided with a second light blocking layer 132, which at least partially fills the second gap between the light transmissive cover 140 and the decorative frame 120, to prevent light from the light emitting body 200 from going out through the second gap, thereby further preventing light mixing or light leakage.

In addition, in some cases, the light transmissive cover 140 has a supporting part 141 mounted on the bracket 110, and there may be a gap between the light transmissive cover 140 and the bracket 110, for example, a third gap between the supporting part 141 of the light transmissive cover 140 and the bracket 110. Accordingly, as shown in FIG. 4, the vehicle lamp assembly may further comprise a third light blocking layer 133, which at least partially fills the third gap, to prevent light from the light emitting body from going out through the third gap, thereby further preventing light mixing or light leakage.

In the embodiment illustrated in FIG. 5, the shell 100 may further comprise a housing 150, which may at least partially define the outer contour of the vehicle lamp assembly. For example, the housing 150 may be an additional decorative frame or a second decorative frame, or may be the housing of the vehicle lamp. As shown in the figure, the light transmissive cover 140 is mounted on the housing 150 to close the opening side or the light emitting side of the housing 150 in order to define a space that accommodates at least the various components (for example, the light source, circuit board, electronic elements, optical elements, bracket, decorative frame, etc.) of the vehicle lamp together with the housing 150. The housing 150 is arranged on the outside of the decorative frame 120 and at least partially overlaps the decorative frame 120. A fourth gap exists between the housing 150 and the decorative frame 120 at the overlapping part, and the light blocking layer 134 at least partially fills the fourth gap, to prevent light from the light emitting body 200 from going out through the fourth gap, thereby further preventing light mixing or light leakage. Although the housing 150 and the decorative frame 120 are shown as different or separate parts of the shell 100 in the illustrated embodiment, in other embodiments, the housing and the decorative frame may be formed as an integral structure, or may be different parts of a one-piece or integral shell 100, or in some cases, the housing or the decorative frame itself may be referred to as the shell 100 or the housing of the vehicle lamp.

It can be understood that the second to the fourth light blocking layers and the spacer layer described above may also comprise elastic material layers or elastic members. For example, they may be made of elastically deformable or compressible materials, or flexible materials with elasticity or compressibility, etc. The material, forming process, structure, size, installation, etc. may be similar to those of the first light blocking layer, and will not be repeated here.

The vehicle lamp assembly described in the embodiments of the present invention may be used as part of a lamp of a motor vehicle, or may be the lamp itself, for example, low beam lights, high beam lights, fog lights, stop lights, turn signals, position lights, daytime running lights, etc.

The embodiments of the present invention also provide a motor vehicle comprising the vehicle lamp assembly described above.

Although the present invention has been explained in conjunction with the drawings, the embodiments disclosed in the drawings are intended to provide a demonstrative illustration of preferred embodiments of the present invention, and must not be interpreted as a limitation of the present invention. The dimensional proportions in the drawings are merely schematic, and must not be interpreted as a limitation of the present invention.

Although some embodiments of the general concept of the present invention have been shown and described, those ordinarily skilled in the art will understand that changes can be made to these embodiments without departing from the principle and motivation of the general concept of the present invention. The scope of the present invention is defined by the claims and their equivalents.

What is claimed is:

1. A vehicle lamp assembly, comprising:
   a bracket, used to support a light emitting body;
   a shell, configured to overlap with at least a part of the bracket, wherein a first gap exists between overlapping parts of the shell and the bracket; and
   a first light blocking layer, provided between overlapping parts of the shell and the bracket and only contacting the shell and the bracket, and at least partially filling the first gap, to prevent light from the light emitting body from emitting outward through the first gap.

2. The vehicle lamp assembly as claimed in claim 1, wherein the first light blocking layer comprises an elastic layer.

3. The vehicle lamp assembly as claimed in claim 1, wherein the first light blocking layer is integrally formed on one of the surfaces of the shell and the bracket facing each other by means of a two-shot injection molding process or a co-extrusion process.

4. The vehicle lamp assembly as claimed in claim 1, wherein the first light blocking layer is disposed in a compressed state between the overlapping parts of the shell and the bracket, so that the first light blocking layer abuts on surfaces of the shell and the bracket facing each other.

5. The vehicle lamp assembly as claimed in claim 1, wherein the first light blocking layer adheres to the shell or the bracket by means of an adhesive.

6. The vehicle lamp assembly as claimed in claim 1, further comprising:
   a light transmissive cover, which has a supporting part mounted on the shell, wherein a second gap exists between the supporting part and the shell; and
   a second light blocking layer, wherein the second light blocking layer at least partially fills the second gap, to prevent light from the light emitting body from emitting outward through the second gap.

7. The vehicle lamp assembly as claimed in claim 6, further comprising:
   a third light blocking layer, wherein the third light blocking layer at least partially fills a third gap, to prevent light from the light emitting body from emitting outward through the third gap, with the third gap existing between the supporting part of the light transmissive cover and the bracket.

8. The vehicle lamp assembly as claimed in claim 1, wherein the shell comprises a decorative frame, with the decorative frame arranged to overlap with at least a part of the bracket, and the first gap is located between the overlapping parts of the decorative frame and the bracket.

9. The vehicle lamp assembly as claimed in claim 8, wherein the shell further comprises:
   a housing, wherein the housing at least partially defines the outer contour of the vehicle lamp assembly, the housing is provided on the outside of the decorative frame and at least partially overlaps with the decorative frame, and a fourth gap exists between the overlapping parts of the housing and the decorative frame;
   the vehicle lamp assembly further comprises a fourth light blocking layer, wherein the fourth light blocking layer at least partially fills the fourth gap, to prevent light from the light emitting body from emitting outward through the fourth gap.

10. The vehicle lamp assembly as claimed in claim 1, further comprising:
a spacer layer, provided between the light emitting body and the bracket, wherein the spacer layer is at least in contact with the parts of the light emitting body and the bracket facing each other.

11. The vehicle lamp assembly as claimed in claim 10, wherein
the first light blocking layer and the spacer layer are one piece.

12. The vehicle lamp assembly as claimed in claim 1, wherein the light emitting body includes a light source or a light guide.

13. A motor vehicle including a vehicle lamp that includes a vehicle lamp assembly, the vehicle lamp assembly comprising:
a bracket, used to support a light emitting body;
a shell, configured to overlap with at least a part of the bracket, wherein a first gap exists between overlapping parts of the shell and the bracket; and
a first light blocking layer, provided between overlapping parts of the shell and the bracket and only contacting the shell and the bracket, and at least partially filling the first gap, to prevent light from the light emitting body from emitting outward through the first gap.

14. A vehicle lamp including a vehicle lamp assembly, the vehicle lamp assembly comprising:
a bracket, used to support a light emitting body;
a shell, configured to overlap with at least a part of the bracket, wherein a first gap exists between overlapping parts of the shell and the bracket; and
a first light blocking layer, provided between overlapping parts of the shell and the bracket and only contacting the shell and the bracket, and at least partially filling the first gap, to prevent light from the light emitting body from emitting outward through the first gap.

15. The vehicle lamp as claimed in claim 14, wherein the vehicle lamp is at least one of low beam lights, high beam lights, turn signals, position lights, reversing lights, fog lights, daytime running lights, and stop lights.

* * * * *